US009200962B1

(12) United States Patent
Russin et al.

(10) Patent No.: US 9,200,962 B1
(45) Date of Patent: Dec. 1, 2015

(54) WINDOW CALIBRATION METHOD FOR HARMONIC ANALYSIS OF OPTICAL SPECTRA

(75) Inventors: Timothy J. Russin, San Diego, CA (US); Alicia M Russin, San Diego, CA (US)

(73) Assignee: THE UNITED STATES OF AMERICA AS REPRESENTED BY THE SECRETARY OF THE NAVY, Washington, DC (US)

( * ) Notice: Subject to any disclaimer, the term of this patent is extended or adjusted under 35 U.S.C. 154(b) by 660 days.

(21) Appl. No.: 13/529,101

(22) Filed: Jun. 21, 2012

(51) Int. Cl.
*G02F 1/39* (2006.01)
*G01J 3/45* (2006.01)
*G01J 3/02* (2006.01)

(52) U.S. Cl.
CPC ...... *G01J 3/45* (2013.01); *G01J 3/02* (2013.01)

(58) Field of Classification Search
CPC .................. G02F 1/39; G01J 3/45; G01J 3/02
USPC .......................................................... 702/76
See application file for complete search history.

(56) References Cited

U.S. PATENT DOCUMENTS

| 3,870,881 | A | * | 3/1975 | Halliday et al. | 250/283 |
| 4,253,152 | A | * | 2/1981 | Holdaway | 702/68 |
| 4,577,338 | A | * | 3/1986 | Takahashi et al. | 378/48 |
| 5,177,560 | A | * | 1/1993 | Stimple et al. | 356/308 |
| 5,579,463 | A | * | 11/1996 | Takano et al. | 345/440 |
| 6,734,857 | B2 | * | 5/2004 | Loughner, II | 345/440.1 |
| 6,816,515 | B1 | * | 11/2004 | Yun et al. | 372/18 |
| 7,013,430 | B2 | * | 3/2006 | Jaffe | 715/771 |
| 7,583,378 | B2 | | 9/2009 | Rezac et al. | |
| 2007/0132761 | A1 | * | 6/2007 | Maruyama et al. | 345/440.1 |
| 2011/0085164 | A1 | | 4/2011 | Nelson et al. | |

OTHER PUBLICATIONS

Lee et al. "Wavelength-swept cascaded Raman fiber laser around 1310nm for OCT imaging", Jul. 2010, 15$^{th}$ OptoElectronics and Communications Conference (OECC2010) Technical Digest, Japan.*
Russin, Timothy J. et al., "Development of a MEMS-based Raman Spectrometer", IEEE Sensors 2010 Conference, Nov. 1-4, 2010, pp. 56-60.

(Continued)

*Primary Examiner* — Janet Suglo
(74) *Attorney, Agent, or Firm* — SPAWAR Systems Center Pacific; Kyle Eppele; Ryan J. Friedl

(57) ABSTRACT

A method includes determining a highest peak of an optical spectrum waveform contained within a wavelength window having a fixed wavelength range, the wavelength window having a beginning wavelength value and an ending wavelength value, and iteratively modifying the beginning and ending wavelength values, within the fixed wavelength range, to shift the wavelength window so the highest peak is centered at a first position within the wavelength window. The method may further include determining a second highest peak of the optical spectrum waveform and iteratively expanding or contracting the optical spectrum waveform, while maintaining the highest peak centered at the first position, to locate the second highest peak at a predetermined position within the wavelength window. The method may be used for window calibration to enable repeatable and precise harmonic analysis of optical spectra, such as Raman spectra.

7 Claims, 10 Drawing Sheets

(56) References Cited

OTHER PUBLICATIONS

Torgrip, Ralf J.O. et al., "Peak Alignment Using Reduced Set Mapping", Journal of Chemometrics, 2003, vol. 17, pp. 573-582.

Forshed, J. et al., "Peak Alignment of NMR Signals by Means of a Genetic Algorithm", Analytica Chimica Actia, Jul. 2003, v. 487, pp. 189-199.

* cited by examiner

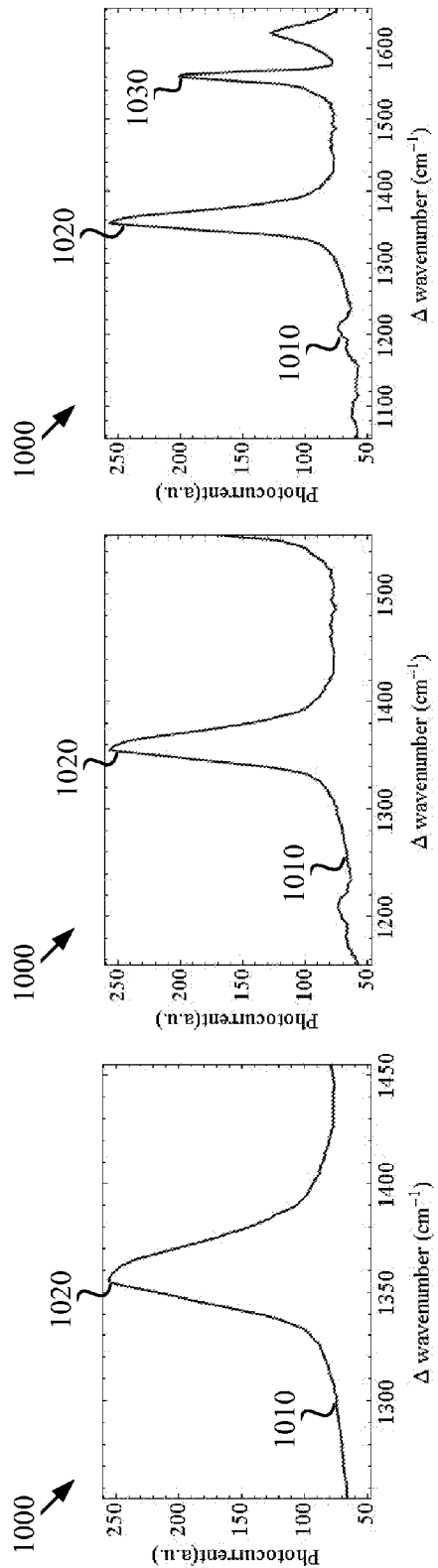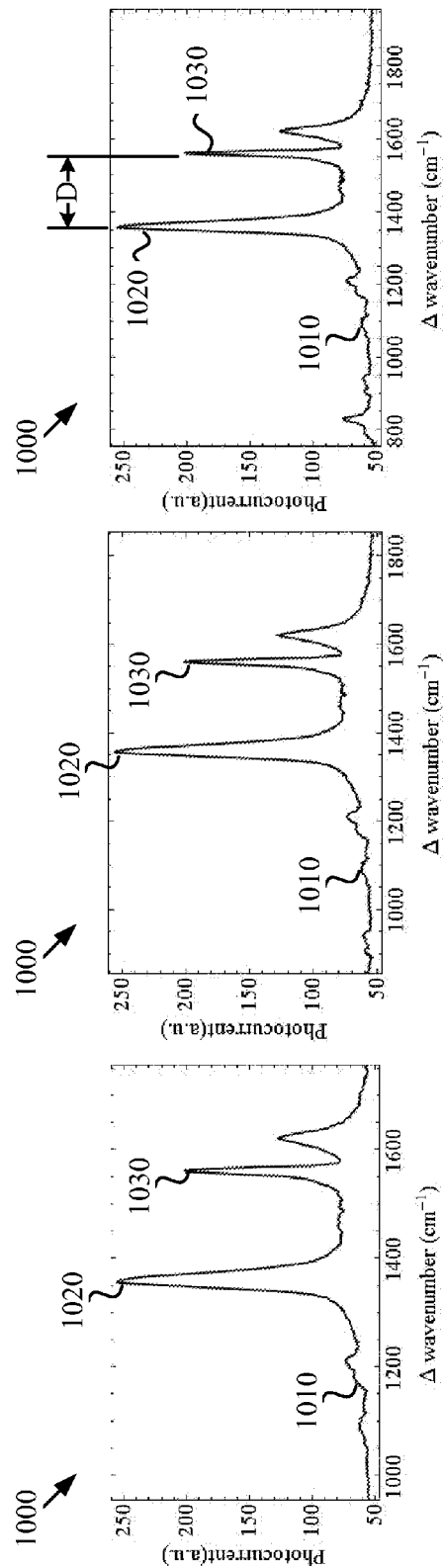
FIG. 12A
FIG. 12B
FIG. 12C
FIG. 12D
FIG. 12E
FIG. 12F

WINDOW CALIBRATION METHOD FOR HARMONIC ANALYSIS OF OPTICAL SPECTRA

FEDERALLY SPONSORED RESEARCH AND DEVELOPMENT

The Window Calibration Method for Harmonic Analysis of Optical Spectra is assigned to the United States Government and is available for licensing for commercial purposes. Licensing and technical inquiries may be directed to the Office of Research and Technical Applications, Space and Naval Warfare Systems Center, Pacific, Code 2112, San Diego, Calif., 92152; voice (619) 553-2778; email ssc_pac_T2@navy.mil. Reference Navy Case No. 101308.

BACKGROUND

The capability to monitor the environment for chemical agents and explosives is of great importance in the current world climate. Providing large-scale coverage of public areas that could be targets to terrorist attacks would be greatly facilitated by an "always-on" distributable sensor, with the ability to differentiate between different compounds (i.e., avoiding false positives for the substance of interest). Numerous research efforts are under way to develop this type of sensor capability; however, numerous problems remain to be solved in terms of implementation.

One of the more versatile methods of chemical detection is that of optical spectroscopy. Rather than electronic or colorimetric chemical sensing techniques, which possess inherent issues with specificity and false positive rates, optical characterization presents the possibility of an unambiguous identification of the analyte of interest. The size requirements for a practically deployable optical sensor limit the total sensor size and thus the size of its components. Accordingly, the implementation of autonomous, small scale chemical and biological sensors is a growing need.

By providing an accurate sensor that can be autonomously deployed and networked, a warfighter's exposure to hazardous substances is greatly reduced. One method for identification of various chemical compounds is through vibrational spectroscopic techniques. Currently however, instruments using such techniques require human operation and are large in size compared to micro electrical mechanical sensors (MEMS). Other devices that are designed to be small and autonomous have numerous false positive readings.

Additionally, current sensors that perform Raman analysis to detect hazardous substances require curve fitting, which must be post-processed. A different approach, described in a paper by Russin et al. entitled "Harmonic Analysis with a MEMS-based Raman Spectrometer", *IEEE Sensors* 2011, uses fast fourier transforms (FFTs) to accurately compare the measured spectrum with known spectra in real-time. This approach uses an absolute sum-difference calculation performed on the FFT of a time-periodic optical (in this case, Raman) signal that is obtained from a MEMS sensor. The result of the sum-difference calculation is used in a threshold determination of the presence of an analyte of interest. While useful, such approach requires precise calibration such that repeatable Raman spectra peak position can occur.

Accordingly, there is a need for a window calibration method to enable repeatable and precise harmonic analysis of optical spectra.

BRIEF DESCRIPTION OF THE DRAWINGS

FIGS. 12A-12F show graphs illustrating the positioning of a second highest peak at a predetermined position within the wavelength window with respect to the position of the highest peak by varying the total window width, in accordance with the Window Calibration Method for Harmonic Analysis of Optical Spectra.

DETAILED DESCRIPTION OF SOME EMBODIMENTS

A MEMS Chemical-Biological Sensor System (CBSS) may be employed using novel spectral analysis techniques to reduce the number of false positive readings. One implementation of a MEMS CBSS uses a Fabry-Pérot interferometer as the spectroscopic element to measure a Raman signal. Unlike typical grating Raman spectrometers, a MEMS CBSS may utilize a single transmission peak of a tunable Fabry-Pérot cavity optimized for, as an example, a 785 nm laser to scan over the spectrum.

Figure 1:
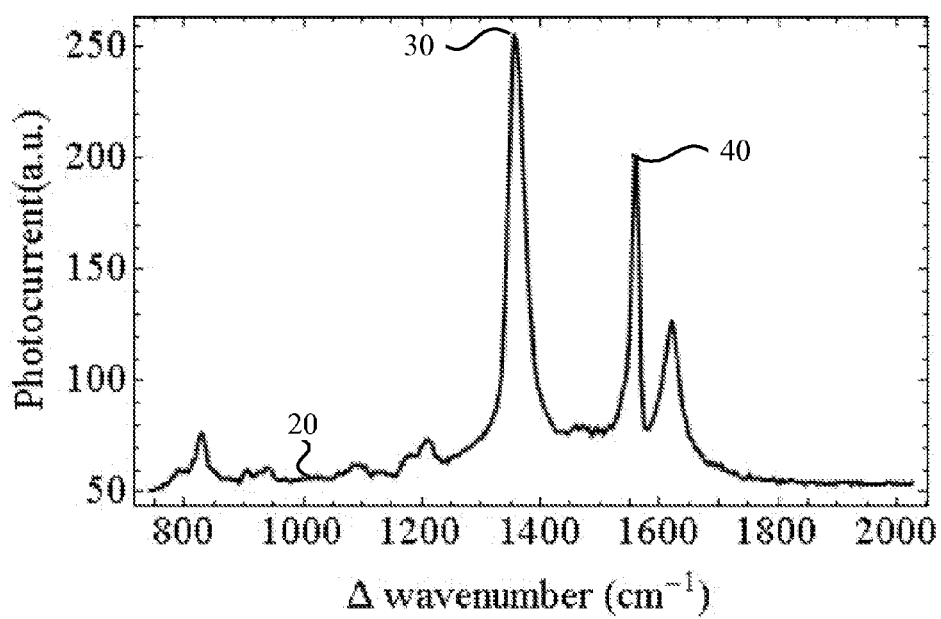
FIG. 1 shows a graph of the Raman spectrum for trinitrotoluene (TNT) over a 1200 wavenumber range.

FIG. 1 shows a graph 10 illustrating a Raman spectrum 20 for trinitrotoluene (TNT) over a 1200 wavenumber range from 800 $cm^{-1}$ to 2000 $cm^{-1}$. As shown, spectrum 20 includes a highest peak 30 and a second highest peak 40. The spectrum shown in FIG. 1 may be obtained by, for example, an up-sweep of a Fabry-Perot interferometer device shown in FIG.

3. A down-sweep of the same device would yield a mirror-image spectrum. FIGS. 5 and 7-9 herein show side-by-side graphs of spectra obtained from both an up-sweep and a down-sweep of the interferometer device.

Once a Raman spectrum is measured it can be compared to the Raman spectra of a known compound of interest, creating a way to detect hazardous materials. Detection of compounds is generally done by applying various curve fitting techniques; however, curve fitting is computationally expensive and is generally not applicable for real-time analysis. The embodiments of the method described herein involve a calibration algorithm in support of a computationally-efficient method of analyzing Raman spectra which can be implemented in real-time.

Figure 2:
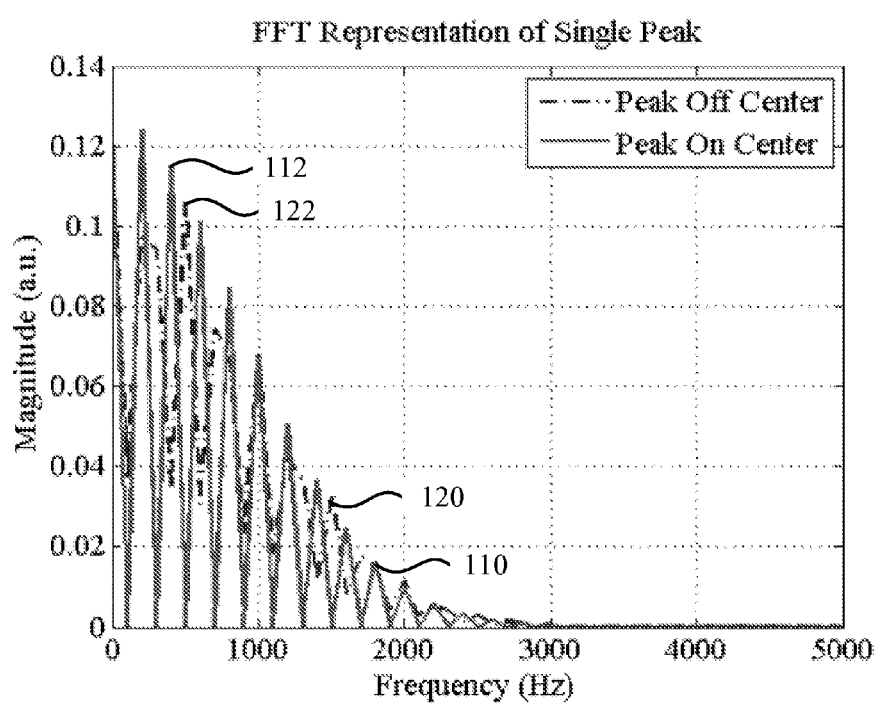
FIG. 2 shows a graph comparing the effects of centered and off-centered Raman peaks on the corresponding Fast Fourier Transform (FFT).

The new analysis method is based upon the Fast Fourier Transform (FFT) and transforms spectral features into harmonics of the scanning frequency. The FFT method requires repeatable placement of the peaks, such as peaks 30 and 40 shown in FIG. 1, in the scanned Raman window in order to achieve repeatable FFT plots. FIG. 2 shows a graph 100 having a first line 110 and a second line 120. First line 110 and second line 120 both result from a FFT performed of the Raman spectrum of TNT shown in FIG. 1. However, first line 110 corresponds to a spectrum with the largest peak centered, while second line 120 corresponds to a spectrum with the largest peak slightly off-center.

As shown in FIG. 2, the values of the FFT function for the centered peak (line 110) and the off-centered peak (line 120) at the harmonics are quite different. An off-centered peak in the Raman spectrum window affects the FFT by changing the relative magnitudes of the FFT peaks occurring at harmonics of the sweep frequency. The method discussed herein provides an efficient method of positioning and stabilizing a Raman spectrum's largest peak in the sweep window's center, without changing the width of the transmission peaks.

Figure 3:
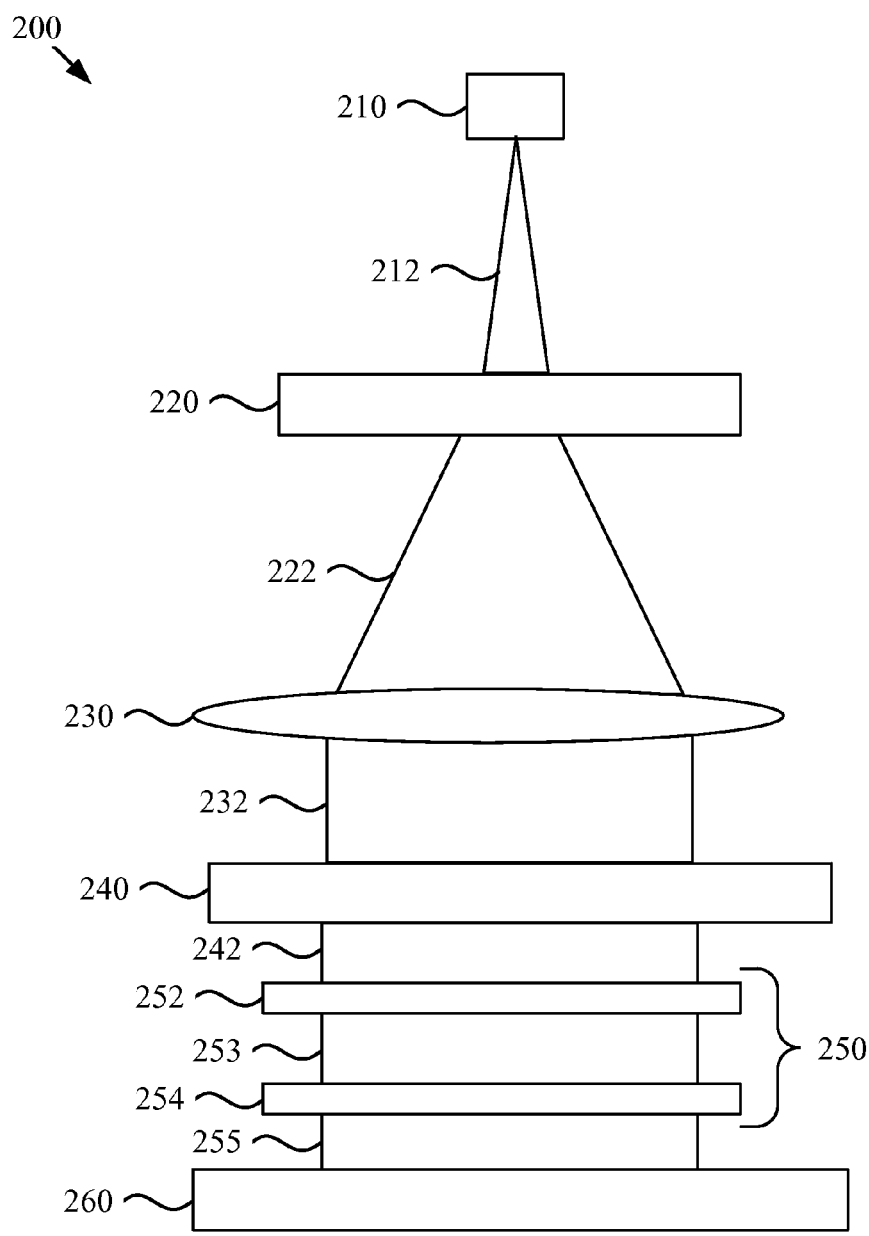
FIG. 3 shows a diagram of an embodiment of a system for use in accordance with the Window Calibration Method for Harmonic Analysis of Optical Spectra.

FIG. 3 shows a diagram illustrating an embodiment of a MEMS-based Raman spectrometer system 200 that may be used in accordance with the method discussed herein. System 200 may include a laser 210 that focuses an optical beam 212 on a substrate containing optically active materials 220. Substrate 220 may be designed for performing surface-enhanced Raman scattering (SERS). Substrate 220 may be designed such that it increases the local electric field experienced by the adsorbed analyte molecules due to a coupling between the incident laser field 212 and localized surface plasmons that may be present in substrate 220. This in turn increases the Raman-scattered radiation. Reported enhancement factors in the literature are typically on the order of $10^6$ for ensemble averages, while enhancements as high as $10^{14}$ have been reported for single molecule SERS.

Due to the laser excitation wavelength currently used (chosen for ease of prototype fabrication, silicon being transparent above ~1 µm), as well as the nature of the proposed analyte (minute airborne quantities of chemical or biological specimens), the SERS substrate 220 is certainly advantageous, if not mandatory. The specific substrate chosen for the current generation of the probe is a film of high aspect ratio (20 nm diameter, 200 nm length) gold nanorods (Nanopartz, Inc.; 30-HAR-1400) deposited on a transparent silica substrate.

The Raman-scattered light 222 is then collected by a collimating lens 230. The resulting light 232 is directed through a laser line rejection filter 240, such as that obtained from Omega Optical, model XE1523. Filter 240 provides an optical density of greater than 5.0 at the laser wavelength, while providing ~85% transmission above the shoulder at ~1550 nm. The resulting filtered light 242 then enters the Fabry-Perot interferometer 250, where the transmitted wavelength of light 255 will depend on the spacing between a top mirror 252 and a bottom mirror 254 by means of destructive interference of the light undergoing multiple reflections between the mirrors 253. The mirror spacing is varied by the application of a voltage to the interferometer electrodes, which creates electrostatic attraction between the two mirrors. Light 255 transmitted from Fabry-Pérot interferometer 250 then illuminates a photodiode 260, such as a commercial off-the-shelf InGaAs photodiode. Photodiode 260 produces a measurable photocurrent that, when correlated with applied voltage, yields the Raman spectrum, such as that shown in FIGS. 1, 5, and 7-9 herein.

Figure 4:
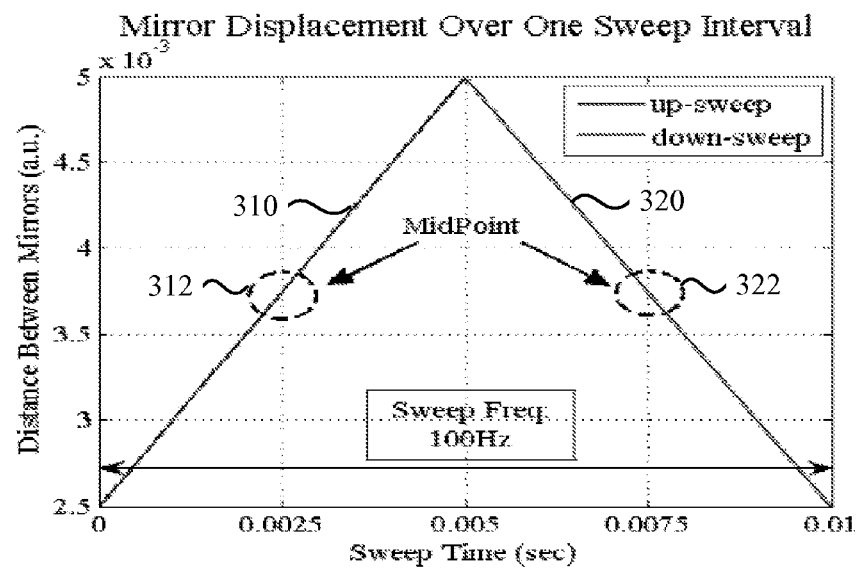
FIG. 4 shows a graph illustrating the distance between mirrors during a sweep of a 2000 $cm^{-1}$ wavelength window for TNT, in accordance with the Window Calibration Method for Harmonic Analysis of Optical Spectra.

A sweep of interferometer 250 includes an up-sweep and down-sweep. The up-sweep corresponds to the distance between the mirrors increasing, as top mirror 252 moves further from bottom mirror 254, which is stationary. Conversely, the down-sweep corresponds to the distance between mirrors 252 and 254 decreasing. FIG. 4 graphically demonstrates how the mirror distance translates with a sweep frequency of 100 Hz. As shown in FIG. 4, graph 300 includes an upward-sloping line 310 corresponding to the up-sweep and a downward-sloping line 320 corresponding to the down-sweep. The midpoint of the up-sweep is shown as point 312, while the midpoint of the down-sweep is shown as point 322.

Figure 5:
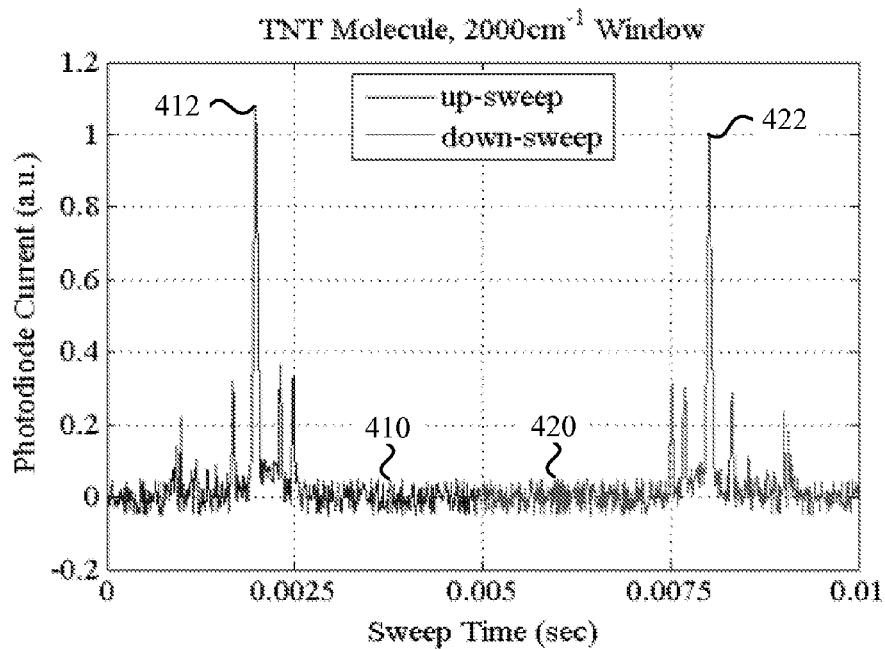
FIG. 5 shows a graph illustrating a representative Raman spectrum resulting from a sweep such as that depicted in FIG. 4, prior to any application of the Window Calibration Method for Harmonic Analysis of Optical Spectra.

Each mirror position correlates to a specific transmitted wavelength with a total window coverage range of 2000 cm-1, for both up- and down-sweeps. Photodiode 260 (shown in FIG. 3) collects filtered light to recreate the entire Raman spectrum, one wavelength at a time. FIG. 5 shows a graph 400 illustrating the corresponding Raman spectra for the sweep performed in FIG. 4. As shown in FIG. 5, line 410 corresponds to the up-sweep, while line 420 corresponds to the down-sweep. The Raman spectrum resulting from the down-sweep is a mirror image of the Raman spectrum resulting from the up-sweep. Accordingly, line 410 contains a highest peak 412 and line 420 contains a highest peak 422. As shown, peak 412 is not centered at the midpoint of the up-sweep, which occurs at a sweep time of 0.0025 sec. Similarly, peak 422 is not centered at the midpoint of the down-sweep, which occurs at a sweep time of 0.0075 sec. In order to provide a consistent periodic signal, the calibration algorithm centers the largest peak, such as peaks 412 and 422, in the obtained Raman spectrum. Adjusting the spectral window's initial and final wavelength values, λi and λf, causes the spectrum peaks' location within the window move.

Figure 6:
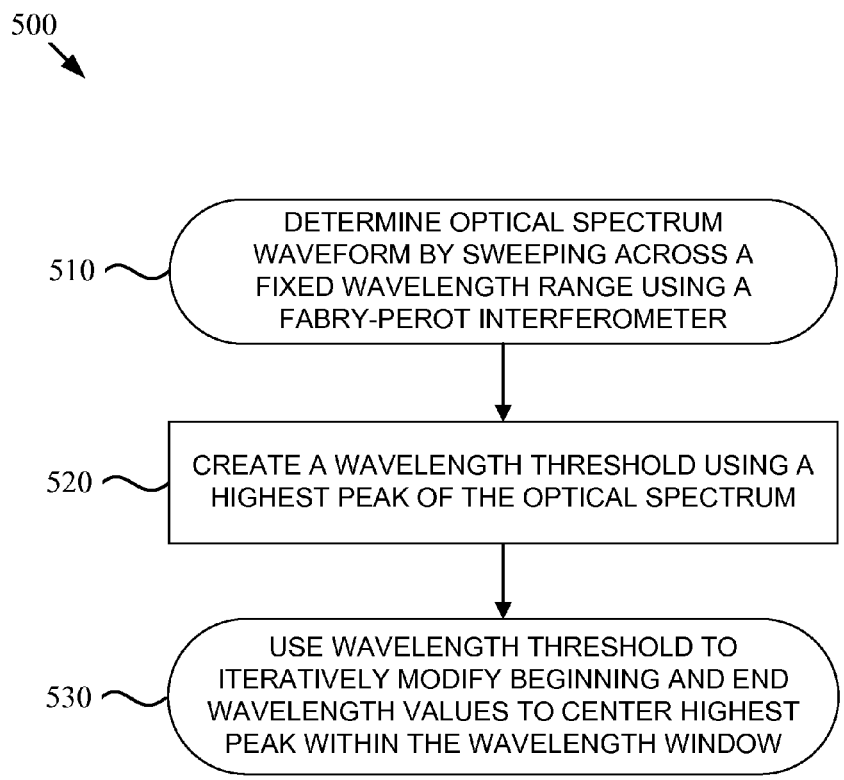
FIG. 6 shows a flowchart of an embodiment of a method in accordance with the Window Calibration Method for Harmonic Analysis of Optical Spectra.

FIG. 6 shows a flowchart of an embodiment of a method 500 in accordance with the Window Calibration Method for Harmonic Analysis of Optical Spectra. Method 500 may utilize a fixed window size and may achieve peak stabilization within 20 sweeps with a maximum error of ±30.0 µs, given no a priori knowledge of the Raman spectrum. As an example, the wavelength changes at a 100 Hz frequency sweep rate, with each sweep consisting of an up-sweep and down-sweep. Using a sampling rate of 100 kHz, the ±30.0 µs error corresponds to the peak's placement being within 3 samples of the window's center.

Method 500 may begin at step 510, which involves determining an optical spectrum waveform, such as a Raman spectrum waveform, by sweeping across a fixed wavelength range. In some embodiments, step 510 includes performing an up-sweep and a down-sweep across the fixed wavelength range using a Fabry-Perot interferometer device, such as device, such as device 250 shown in FIG. 3. In such embodiments, the position of the Fabry-Perot interferometer is controlled via the application of a voltage to a capacitive electrode that electrostatically attracts the upper mirror towards the lower mirror. The voltage is correlated to the position of the mirror, so by changing the voltage one is actually changing the separation of the mirrors. The mirrors are modulated between a starting and ending position; the total mirror position range is what is referred to as the "window."

The resulting optical spectrum waveform, such as spectrum 20 shown in FIG. 1, will be contained within a wavelength window having a beginning wavelength value and an ending wavelength value. As shown in FIG. 1, the beginning wavelength (wavenumber) value is 800 cm$^{-1}$ and the ending wavelength (wavenumber) value is 2000 cm$^{-1}$. Next, step 520 involves creating a wavelength threshold using a highest peak, such as peak 30, of the determined optical spectrum waveform, such as waveform 20.

Step 530 may then involve using the wavelength threshold to iteratively modify the beginning wavelength value and the ending wavelength value, within the fixed wavelength range, to shift the wavelength window so the highest peak is centered at a first position within the wavelength window. The center location of the window, $X_C$, may be calculated using the beginning wavelength value, $X_1$, and the ending wavelength value, $X_2$, where $X_C = (X_2 - X_1)/2$.

As discussed in more detail below, in some embodiments, step 530 involves modifying the beginning wavelength value and the ending wavelength value based upon a ratio between a peak center value and a sweep center value, wherein the wavelength threshold is used to calculate the peak center value. In such embodiments, the sweep center value is the wavelength value at the wavelength window's up-sweep and down-sweep midpoint. Further, in such embodiments, modifying the beginning wavelength value and the ending wavelength value includes varying the beginning wavelength value and the ending wavelength value based upon an error between the sweep center value and the peak center value.

As an example, the main peak may be centered as follows. Initially, the entire available wavelength range is swept, depended on the physical limits of the mirror's translation. The value of the largest peak in the resulting spectrum is used to create a threshold, referenced herein as PeakThres. The initial sweep also determines in which part of the window the main peak is located. The algorithm adjusts the beginning and end wavelength values of the window within the range of detectable wavelengths in order to move the largest spectrum peak closer towards the middle of the window. In order to keep the width of the peaks in the spectrum constant, a fixed window size of constant Δλ is used. For the following sweeps during calibration, the algorithm calculates where the peak is and how to adjust the window for future sweeps.

When the measured value of the photodiode goes above PeakThres, the corresponding wavelength is recorded as ThresholdUp. When photodiode value goes below the threshold, the algorithm records the wavelength value, ThresholdDown, corresponding to the last photodiode value above the threshold. The PeakCenter value is calculated by taking the average of the two recorded wavelength values, when the photodiode current crossed the threshold, PeakCenter=(ThresholdUp−ThresholdDown)/2     (Eq. 1)

SweepCenter is the wavelength at window's up-sweep and down-sweep midpoint. The ratio between PeakCenter and SweepCenter is used to adjust the starting wavelength for the next sweep, k+1, StartingWavelength$_{k+1}$ ∝ (PeakCenter$_k$/SweepCenter$_k$) StartingWavelength$_k$     (Eq. 2)

The amount that the wavelength changes is based on the error between SweepCenter and PeakCenter, Error=SweepCenter−PeakCenter     (Eq. 3)

If there is a large error, broad tuning is applied to change the starting wavelength value by a large amount. The ratio between PeakCenter and SweepCenter from Eq. 2 is multiplied by a constant. The value of the constant is based on whether the wavelength window needs to shift up or down.

For standard tuning, the error given by Eq. 3 has gone below some predetermined error level where broad tuning is no longer applied. In this case, Eq. 2 becomes an exact relationship corresponding to the proportionality becoming an equality. When the ratio becomes close to unity the window no longer shifts after applying normal tuning, fine tuning is applied. In fine tuning, the error from Eq. 3 is calculated to make sure it is within the needed tolerance of ±30.0 μs. If the error is larger, the starting wavelength is adjusted by one increment up or down, dependent upon the smallest achievable mirror displacement. When the calibration reaches a starting window value and remains at that value for two successive sweeps it has reached steady-state.

During steady-state it is possible for the starting window value to change, if fine tuning continues to be applied. However, the window should never drift, according to the rules of steady-state stability, it should only oscillate. After 20 sweeps for example, if the starting value has oscillated between two values, the average error for each window start value is calculated and the one with the smallest average error is set as the starting window value.

Simulation Results

A simulation of the calibration algorithm was performed for a window size of 2000 cm$^{-1}$ with the wavelength range swept at 100 Hz frequency and a sampling rate of 100 kHz. Each sweep consists of an up-sweep and down-sweep; distance between mirrors increases and decreases respectively. For this simulation, the Raman spectrum for trinitrotoluene (TNT) is used with a signal to noise (S/N) ratio of 20.

The algorithm begins by sweeping the entire wavelength window, as seen in FIG. 4 for TNT. The maximum value in the Raman Spectrum of TNT is 1.08. This value is used to create the threshold at 75% of the maximum value to account for noise variation in future sweeps, PeakThres=0.75*MaxValue=0.75*1.08=0.81. Then, the algorithm reduces the window size to allow the spectral window to shift in order to center the main peak. The algorithm uses 75% of the detectable wavelength range for the first iteration, as shown in FIG. 7.

Figure 7:
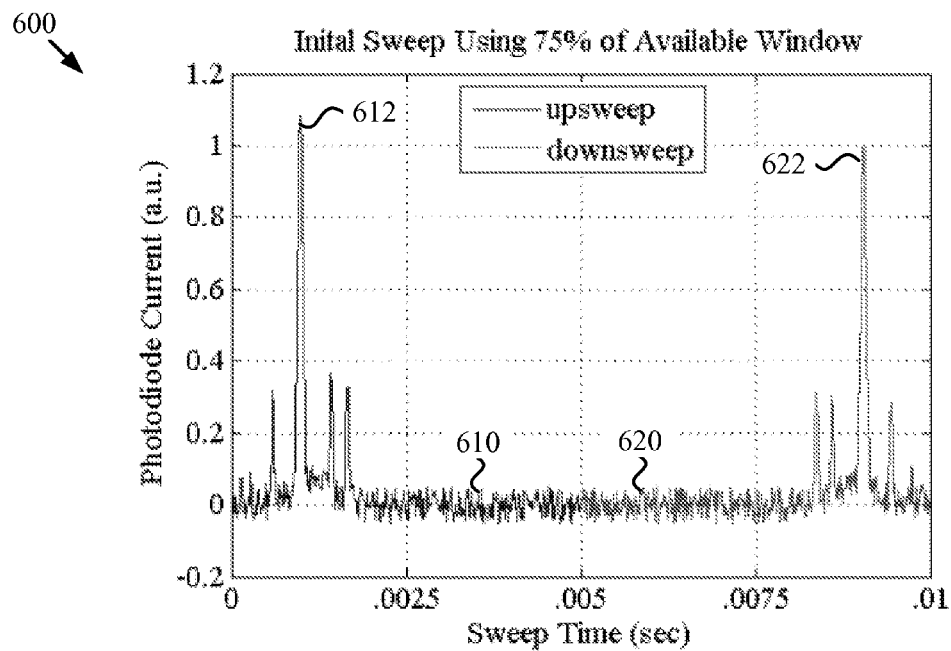
FIG. 7 shows a graph illustrating the Raman spectrum for TNT using 75% of the available wavelength window range, removing the smaller wavelengths to move the highest peak from FIG. 5 away from center, in accordance with the Window Calibration Method for Harmonic Analysis of Optical Spectra.

FIG. 7 shows a graph 600 illustrating the Raman spectrum for TNT using 75% of the available wavelength window range. By using 75% of the available window range, the smaller wavelength is removed such that the highest peaks 612 and 622 (peaks 412 and 422 from FIG. 5) are moved away from center, which occurs at 0.0025 sec for line 610 and 0.0075 sec for line 620. FIG. 7 exaggerates the window shift by removing the wrong side of the window, causing peaks 612 and 622 to shift further from the center than in the full sweep. Although the calibration is still able to center the peak when it starts far off-centered, it is not as quick. By having the algorithm calculate which direction the window should shift in order to move the peak closer to the center the calibration time is decreased.

Figure 8:
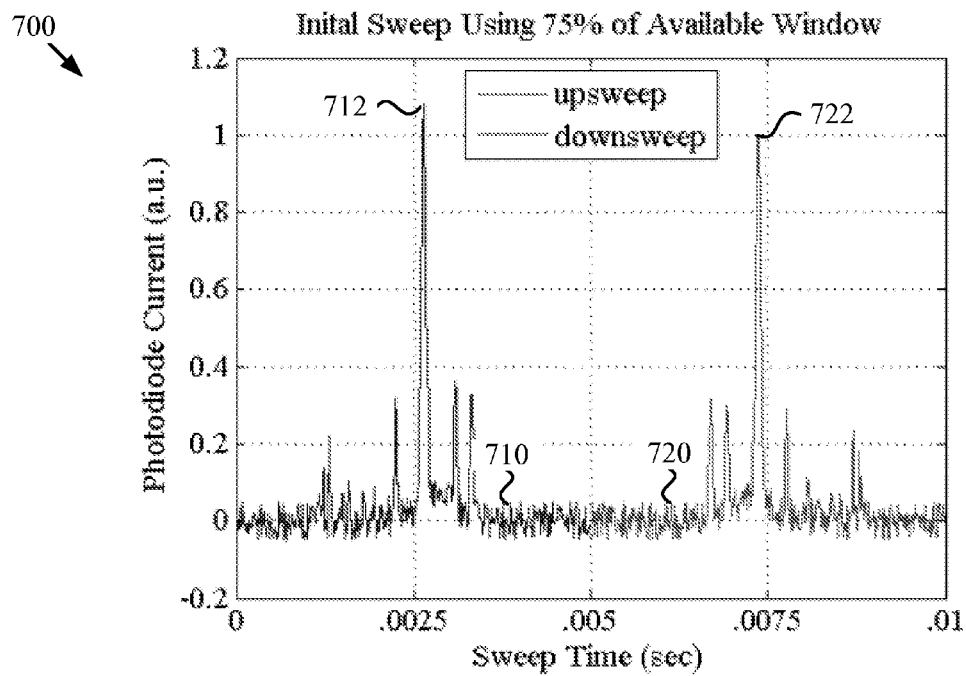
FIG. 8 shows a graph illustrating the Raman spectrum for TNT using 75% of the available wavelength window range, removing the larger wavelengths to move the highest peak from FIG. 5 closer to center, in accordance with the Window Calibration Method for Harmonic Analysis of Optical Spectra.

FIG. 8 shows a graph 700 illustrating the Raman spectrum for TNT using 75% of the available wavelength window range. By using 75% of the available window range, the larger wavelength is removed such that the highest peaks 712 and 722 (peaks 412 and 422 from FIG. 5) are closer to center, which occurs at 0.0025 sec for line 710 and 0.0075 sec for line 720.

During each sweep, the threshold is used for determining the location of the main peak within the window. Using 75% of the initial value as the threshold, when the photodiode current first goes above PeakThres, the corresponding sample number is recorded. Additionally, when the photodiode goes below PeakThres, the previous sample number is recorded. The PeakCenter value is calculated according to Eq. 1. The ratio between PeakCenter and SweepCenter is calculated and either the broad tuning or the standard tuning is used based on the magnitude of the error.

If the absolute value of the error is greater than 100 μs, broad tuning is used. When the error calculated in Eq. 3 is greater than 100 μs, the ratio is multiplied by 0.5. When the error is less than −100 μs, the ratio is multiplied by 2. If the error is less than or equal to 100 μs, standard tuning is applied and the next starting wavelength is shifted by the ratio of PeakCenter to SweepCenter times the previous starting wavelength. Fine tuning is used when the error is greater than 30 μs, but the ratio of PeakCenter to SweepCenter is so close to unity that the window position no longer changes.

Figure 9:
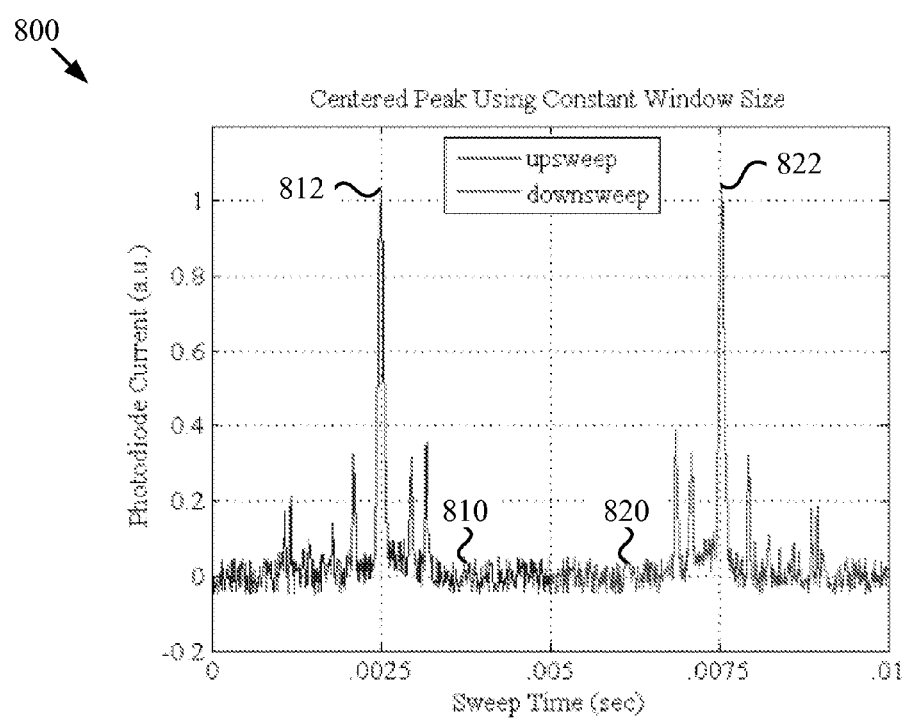
FIG. 9 shows a graph illustrating the highest peak from FIG. 5 being centered within the wavelength window, in accordance with the Window Calibration Method for Harmonic Analysis of Optical Spectra.

Applying the above calibration method, the simulation was performed resulting in the main peak centered within 11 sweeps and 10 μs of the sweep midpoint for each successive sweep. FIG. 9 shows a graph 800 of the calibrated spectra represented by lines 810 and 820. The spectrum shown in FIG. 9 was measured on the 11th sweep. As shown, the highest peaks 812 and 822 are centered at the midpoints of the up-sweep and down-sweep, which occur at 0.0025 sec and 0.0075 sec, respectively.

When the simulation reached steady-state, the starting window remained at a constant window value until the 20th sweep, when the window shifted up one wavelength increment, dependent on the smallest achievable mirror displacement. The average error for each steady-state value was calculated and the window start value prior to the 20th sweep shift had a smaller average error; thus it was chosen to remain as the starting window value for all future sweeps. The cumulative error between sweep 11 and 20 is 35 μs. Once completed with the calibration, the start and finish wavelength values remain final steady-state value and the algorithm waits to be called again to request a recalibration depending on possible drift that may occur with lifetime aging of the spectrometer.

Figure 10:
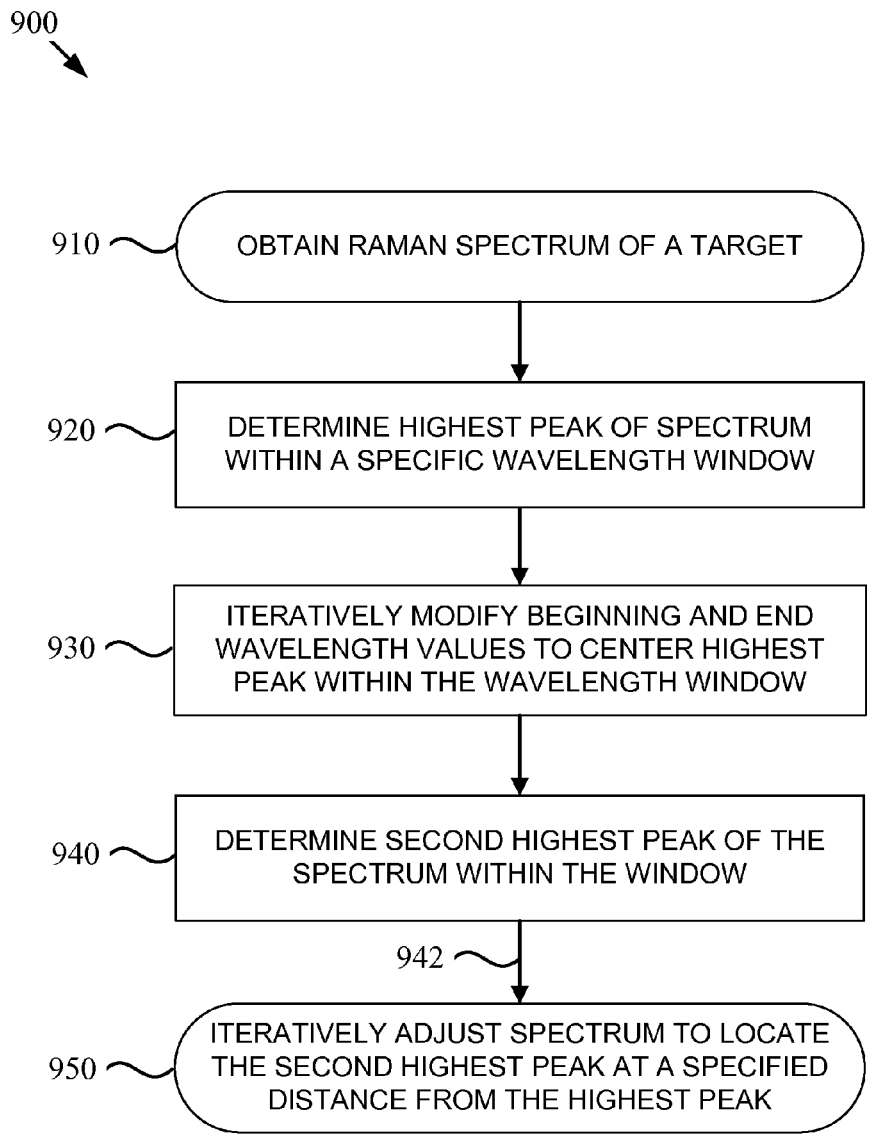
FIG. 10 shows a flowchart of an embodiment of a method in accordance with the Window Calibration Method for Harmonic Analysis of Optical Spectra.

FIG. 10 shows a flowchart of an embodiment of a method 900 in accordance with the Window Calibration Method for Harmonic Analysis of Optical Spectra. Method 900 may begin at step 910, which involves obtaining an optical spectrum waveform, such as a Raman spectrum waveform, of a target. In some embodiments, step 910 involves sweeping across a fixed wavelength range using a Fabry-Perot interferometer similar to step 510 of method 500 as discussed above. As an example, the target may be as before Trinitrotoluene, or paranitrotoluene (or in principle any chemical of interest). Next, step 920 involves determining a highest peak of the optical spectrum waveform contained within a wavelength window having a fixed wavelength range, the wavelength window having a beginning wavelength value and an ending wavelength value. For example, step 920 may involve determining that peak 30 shown in FIG. 1 is the highest peak of Raman spectrum 20. The determination in step 920 may be made by analyzing the digitization of the photocurrent trace that is measured by the photodiode. The wavelength corresponding to the largest photocurrent amplitude corresponds to the position of the highest peak.

Method 900 may then proceed to step 930, which involves iteratively modifying the beginning wavelength value and the ending wavelength value by equal amounts, while maintaining the fixed wavelength range, to shift the wavelength window so the highest peak is centered at a first position within the wavelength window. In some embodiments, step 930 involves using a wavelength threshold to iteratively modify the beginning and ending wavelength values, as discussed with regard to step 530 of method 500 discussed above.

In some embodiments, method 900 may then proceed to step 940, which involves determining a second highest peak of the optical spectrum waveform contained within the wavelength window. For example, step 940 may determine that peak 40 is the second highest peak of Raman spectrum 20 as shown in FIG. 1. The determination in step 940 may be made by analyzing the digitization of the photocurrent trace measured by the photodiode. The wavelength corresponding to the second largest photocurrent amplitude (separated by the highest peak by a trough whose depth is at least 50% of the highest peak amplitude) is the position of the second highest peak.

Figure 11:
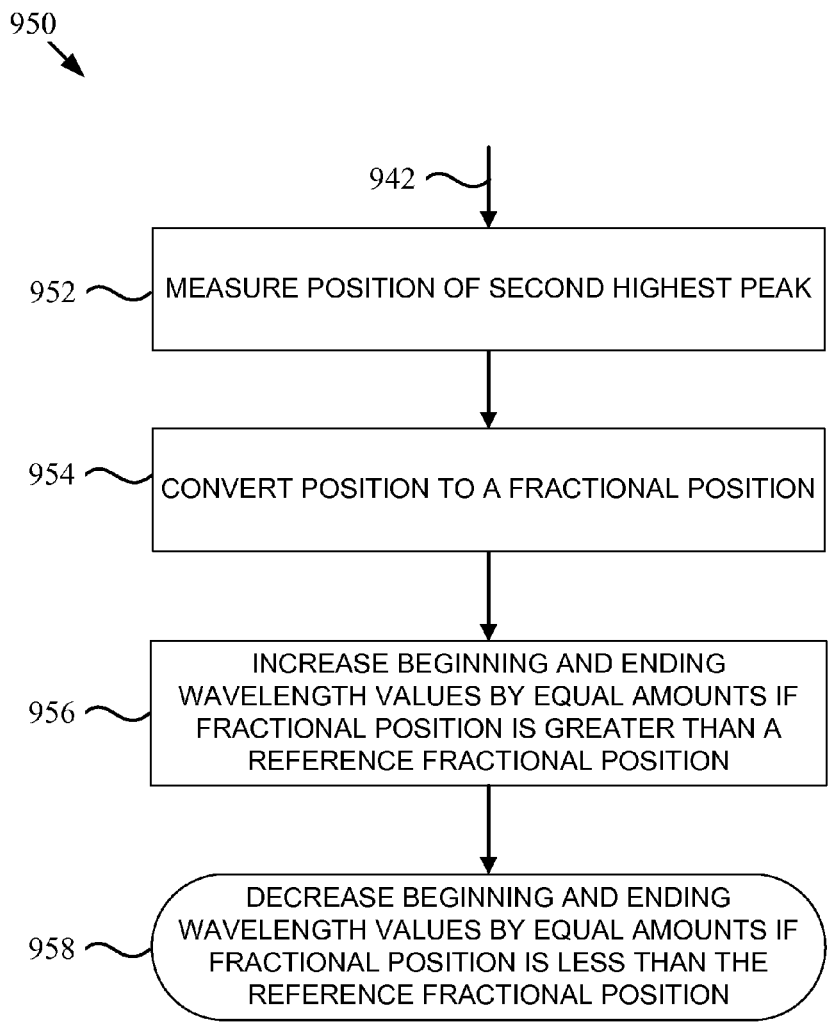
FIG. 11 shows a flowchart of an embodiment of a step for locating the second highest peak of an optical spectrum at a specified distance within a wavelength window from the highest peak of the optical spectrum, in accordance with the Window Calibration Method for Harmonic Analysis of Optical Spectra.

Next, method 900 may proceed along flow path 942 to step 950, which involves iteratively expanding or contracting the optical spectrum waveform, while maintaining the highest peak centered at the first position, to locate the second highest peak at a predetermined position within the wavelength window with respect to the first position. As shown in FIG. 11, step 950 may include step 952, which involves measuring the position of the second highest peak. Next, step 954 may involve converting the position of the second highest peak to a fractional position, wherein the fractional position is a fraction of the total width of the wavelength window.

For example, position of the second highest peak is converted to a fraction of the total window width, Frac, (measured from the center), according to:

$$\text{Frac} = (X_C - X_W)/(X_C - X_2),\qquad\text{(Eq. 4)}$$

where $X_C$ is the wavelength value corresponding to the center of the wavelength window, $X_W$ is the total width of the wavelength window, and $X_2$ is the ending wavelength value of the wavelength window. This fraction, Frac, is then compared to a reference fraction, which may be chosen depending on where the user desires the second peak to be located. For example, if the user desires that the second peak be located halfway between the center and the edge of the window, the reference fraction would be ½.

Step 950 may then involve iteratively comparing the fractional position to a reference fractional position and modifying the beginning wavelength value and the ending wavelength value to locate the second highest peak at the predetermined position within the wavelength window with respect to the first position. As such, step 956 may comprise, while keeping the highest peak centered at the first position, increasing the beginning wavelength value and decreasing the end wavelength value by equal amounts if the fractional position is greater than the reference fractional position. Further, step 558 may comprise, while keeping the highest peak centered at the first position, decreasing the beginning wavelength value and increasing the end wavelength value by equal amounts if the fractional position is less than or equal to the reference fractional position.

As an example, if the fraction is greater than one-half, $X_1$ (the beginning wavelength value) and $X_2$ are decreased and increased, respectively, by equal amounts, increasing the width of the window and leaving it centered on the peak at $X_C$. Similarly, if the fraction is less than one-half, $X_1$ and $X_2$ are increased and decreased, respectively, by equal amounts, keeping the center peak positioned at $X_C$. The increasing/decreasing of the wavelength values is discussed further with respect to FIGS. 12A-12F below.

FIGS. 12A-12F, show graphs 1000 illustrating the positioning of a second highest peak at a predetermined position within the wavelength window with respect to the position of the highest peak, such as by step 950 of method 900 discussed above. As shown, graphs 1000 include an optical spectrum waveform 1010 having a highest peak 1020 and a second highest peak 1030. Highest peak 1020 (with wavenumber of 1350) has been centered in the window via the above-described method As shown in FIG. 12A, the wavelength window ranges from wavenumber (wavelength) values 1250 to 1450, with second highest peak 1030 (with wavenumber of 1560) not appearing in the wavelength window. As discussed in method 900 above, the wavelength values are modified in equal amounts to position second highest peak 1030 within the wavelength window. As shown in FIG. 12B, the beginning and ending wavenumber values have been modified by 100 to values of 1150 to 1550. However, at such values, second highest peak 1030 does not appear in the wavelength window. Accordingly, more wavelength value modifications are required.

As shown in FIG. 12C, the wavelength window range has been modified again to a beginning wavenumber value of 1050 and an ending wavenumber value of 1650. At such values, second highest peak 1030 now appears in the wavelength window. In FIGS. 12D-12F, the wavelength window range is modified from between wavenumber values 950 to 1750 (FIG. 12D), to between 850 and 1850 (FIG. 12E), and finally to between 750 and 1950 (FIG. 12F). For the situation described above where the second peak is desired to be placed at ½ the window width, FIG. 12D shows the scanning range of the window. As shown in FIG. 12F, once second highest peak 1030 is positioned within the window, it is located at a distance, D, from highest peak 1020. In some embodiments, distance D is predetermined. Once this step is complete, the window is now measuring a repeatable wavelength range and is properly calibrated for performing harmonic analysis of optical spectra.

Variations on the above calibration in methods 500 and 900 may include allowing the window size to vary, depending on the desired wavelength range of Raman spectrum. In general, a large wavelength window may be used. Since the window was initially shrunk to allow the main peak to be centered, not all of the available wavelength range is utilized. After the peak has been centered at a stable starting window value, it may be possible to expand the window slightly while still keeping the peak centered, if the start or end window value is not at the limit of the wavelength range.

The window expansion may be performed according to the following steps. Initially, the window width remains stationary until the window shift has reached steady state. Once at steady state the window's start value is compared to the minimum wavelength value that can be measured. If the window's value is greater, the window's finish value is compared to the maximum wavelength value. The distance between the start and minimum value and the finish and maximum value are calculated to determine how much the window can expand. Whichever end has the shortest distance to the limit is used to expand the window by adding that value to each end of the window. This still keeps the main peak centered while allowing expansion of the measured wavelength range.

It is also possible to implement a calibration that uses window sizing rather than window shifting to center the spectra main peak. In this case, only the window side furthest from the peak would move and the window would shrink to the minimum amount needed to center the peak. However, if the window size varies, the width of the peaks will change. To account for this the calibration algorithm would have to pass the wavelength window width to the harmonic analysis algorithm in order for the FFT to be correctly compared to known spectra.

Some or all of the steps of methods 500 and 900 may be stored on a computer-readable storage medium, such as a non-transitory computer-readable storage medium, wherein the steps are represented by computer readable programming code. The steps of methods 500 and 900 may also be computer-implemented using a programmable device, such as a computer-based system. Methods 500 and 900 may comprise instructions that, when loaded into a computer-based system, cause the system to execute the steps of methods 500 and 900. Methods 500 and 900 may be computer implemented using various programming languages, such as "Java", "C" or "C++".

Various storage media, such as magnetic computer disks, optical disks, and electronic memories, as well as computer readable media and computer program products, can be prepared that can contain information that can direct a device, such as a micro-controller, to implement the above-described systems and/or methods. Once an appropriate device has access to the information and programs contained on the storage media, the storage media can provide the information and programs to the device, enabling the device to perform the above-described systems and/or methods.

For example, if a computer disk containing appropriate materials, such as a source file, an object file, or an executable file, were provided to a computer, the computer could receive the information, appropriately configure itself and perform the functions of the various systems and methods outlined in the diagrams and flowcharts above to implement the various functions. That is, the computer could receive various portions of information from the disk relating to different elements of the above-described systems and/or methods, implement the individual systems and/or methods, and coordinate the functions of the individual systems and/or methods.

Many modifications and variations of the Window Calibration Method for Harmonic Analysis of Optical Spectra are possible in light of the above description. Within the scope of the appended claims, the Window Calibration Method for Harmonic Analysis of Optical Spectra may be practiced otherwise than as specifically described. The scope of the claims is not limited to the implementations and embodiments disclosed herein, but extends to other implementations and embodiments as may be contemplated by those having ordinary skill in the art.

We claim:

1. A method comprising the steps of:
   using a photodiode to collect light transmitted from a sweep of a Fabry-Perot interferometer device;
   correlating a photocurrent produced by the photodiode, responsive to the collected light, with an applied voltage to generate a Raman spectrum waveform, the Raman spectrum waveform displayed within a wavelength window having a beginning wavelength value and an ending wavelength value;
   determining a position of a highest peak of the Raman spectrum waveform;
   using a wavelength threshold to iteratively modify the beginning wavelength value and the ending wavelength value by equal amounts, while maintaining the fixed wavelength range, to shift the wavelength window so the position of the highest peak is centered at a first position within the wavelength window;
   determining a second highest peak of the Raman spectrum waveform displayed within the wavelength window; and iteratively expanding or contracting the Raman spectrum waveform, while maintaining the highest peak centered at the first position, to locate the second highest peak at a predetermined position within the wavelength window with respect to the first position.

2. The method of claim 1, wherein the step of iteratively expanding or contracting the Raman spectrum waveform comprises the steps of:

measuring the position of the second highest peak;

converting the position of the second highest peak to a fractional position, wherein the fractional position is a fraction of the total width of the wavelength window; and iteratively comparing the fractional position to a reference fractional position and modifying the beginning wavelength value and the ending wavelength value to locate the second highest peak at the predetermined position within the wavelength window with respect to the first position.

3. The method of claim 2, wherein the step of modifying the beginning wavelength value and the end wavelength value to locate the second highest peak at the predetermined position within the wavelength window with respect to the first position comprises the steps of:

while keeping the highest peak centered at the first position, increasing the beginning wavelength value and decreasing the end wavelength value by equal amounts if the fractional position is greater than the reference fractional position; and while keeping the highest peak centered at the first position, decreasing the beginning wavelength value and increasing the end wavelength value by equal amounts if the fractional position is less than or equal to the reference fractional position.

4. The method of claim 1, wherein the step of modifying the beginning wavelength value and the ending wavelength value is based upon a ratio between a peak center value and a sweep center value, wherein the wavelength threshold is used to calculate the peak center value.

5. The method of claim 4, wherein the sweep center value is the wavelength value at the wavelength window's up-sweep and down-sweep midpoint.

6. The method of claim 4, wherein the step of modifying the beginning wavelength value and the ending wavelength value includes varying the beginning wavelength value and the ending wavelength value based upon an error between the sweep center value and the peak center value.

7. The method of claim 1, wherein the position of the highest peak of the Raman spectrum waveform corresponds to the wavelength corresponding to the largest photocurrent amplitude.

* * * * *